(12) United States Patent
Blake et al.

(10) Patent No.: US 10,489,294 B2
(45) Date of Patent: Nov. 26, 2019

(54) HOT CACHE LINE FAIRNESS ARBITRATION IN DISTRIBUTED MODULAR SMP SYSTEM

(71) Applicant: International Business Machines Corporation, Armonk, NY (US)

(72) Inventors: Michael A. Blake, Wappingers Falls, NY (US); Rebecca M. Gott, Poughkeepsie, NY (US); Pak-Kin Mak, Poughkeepsie, NY (US); Vesselina K. Papazova, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/479,624

(22) Filed: Apr. 5, 2017

(65) Prior Publication Data

US 2018/0293172 A1  Oct. 11, 2018

(51) Int. Cl.
| | |
|---|---|
| *G06F 12/084* | (2016.01) |
| *G06F 12/0811* | (2016.01) |
| *G06F 12/0831* | (2016.01) |
| *G06F 9/52* | (2006.01) |
| *G06F 12/0855* | (2016.01) |

(52) U.S. Cl.
CPC ........... *G06F 12/0857* (2013.01); *G06F 9/52* (2013.01); *G06F 12/084* (2013.01); *G06F 12/0811* (2013.01); *G06F 12/0831* (2013.01); *G06F 2212/1024* (2013.01)

(58) Field of Classification Search
None
See application file for complete search history.

(56) References Cited

U.S. PATENT DOCUMENTS

| 5,875,462 | A | * | 2/1999 | Bauman | G06F 12/0811 |
| | | | | | 711/117 |
| 6,094,686 | A | | 7/2000 | Sharma | |
| 2003/0236817 | A1 | | 12/2003 | Radovic et al. | |
| 2004/0230751 | A1 | * | 11/2004 | Blake | G06F 12/0813 |
| | | | | | 711/147 |
| 2006/0143390 | A1 | | 6/2006 | Kottapalli | |
| 2008/0059712 | A1 | | 3/2008 | Fedorova | |

(Continued)

OTHER PUBLICATIONS

Weirong Zhu, "Efficient Synchronization for a Large-Scale Multi-Core Chip Architecture", UMI 3267164, ProQuest Information and Learning Company, 2007, p. 1-207.

(Continued)

*Primary Examiner* — Denise Tran
(74) *Attorney, Agent, or Firm* — Cantor Colburn LLP; William Kinnaman (57) ABSTRACT

Embodiments of the present invention are directed to hot cache line arbitration. An example of a computer-implemented method for hot cache line arbitration includes receiving a request for exclusive access to a cache line from a requestor of a drawer in a processing system. The method further includes bringing the cache line to a local cache of the drawer. The method further includes invalidating copies of the cache line in the processing system. The method further includes loading a remote fetch address register (RFAR) controller on other drawers in the processing system, wherein the RFAR comprises a local pending flag and a remote pending flag.

18 Claims, 6 Drawing Sheets

(56) References Cited

U.S. PATENT DOCUMENTS

| | | |
|---|---|---|
| 2008/0071990 A1 | 3/2008 | Walters et al. |
| 2008/0134185 A1 | 6/2008 | Fedorova |
| 2009/0031314 A1 | 1/2009 | Moscibroda et al. |
| 2011/0320659 A1* | 12/2011 | Ambroladze ....... G06F 12/0811 |
| | | 710/111 |
| 2013/0160020 A1 | 6/2013 | Grochowski et al. |

OTHER PUBLICATIONS

Tam et al., "Thread clustering: sharing-aware scheduling on SMP-CMP-SMT multiprocessors." ACM SOGOPS Operating Systems Review. vol. 41. No. 3. ACM, 2007, pp. 47-58.

* cited by examiner

HOT CACHE LINE FAIRNESS ARBITRATION IN DISTRIBUTED MODULAR SMP SYSTEM

BACKGROUND

The present invention generally relates to computer system design, and more specifically, to hot cache line arbitration.

Symmetric multiprocessing (SMP) systems utilize a multiprocessor hardware and software architecture. Two or more processors are connected to a single, shared main memory. For example, an SMP system can have a centralized shared memory that operates using a single operating system with two or more processors. Each processor can utilize its own cache memory (or simply "cache") to speed up data access to the shared memory and to reduce the system bus traffic. Some SMP systems can utilize multiple cache memories and/or multiple levels of cache memory that may be shared between and among various processors.

SUMMARY

Embodiments of the present invention are directed to a computer-implemented method for hot cache line arbitration. A non-limiting example of the computer-implemented method includes receiving a request for exclusive access to a cache line from a requestor of a drawer in a processing system. The method further includes bringing the cache line to a local cache of the drawer. The method further includes invalidating copies of the cache line in the processing system. The method further includes loading a remote fetch address register (RFAR) controller on other drawers in the processing system, wherein the RFAR comprises a local pending flag and a remote pending flag.

Embodiments of the present invention are also directed to a system for hot cache line arbitration. Additional embodiments of the present invention are directed to a computer program product for hot cache line arbitration.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
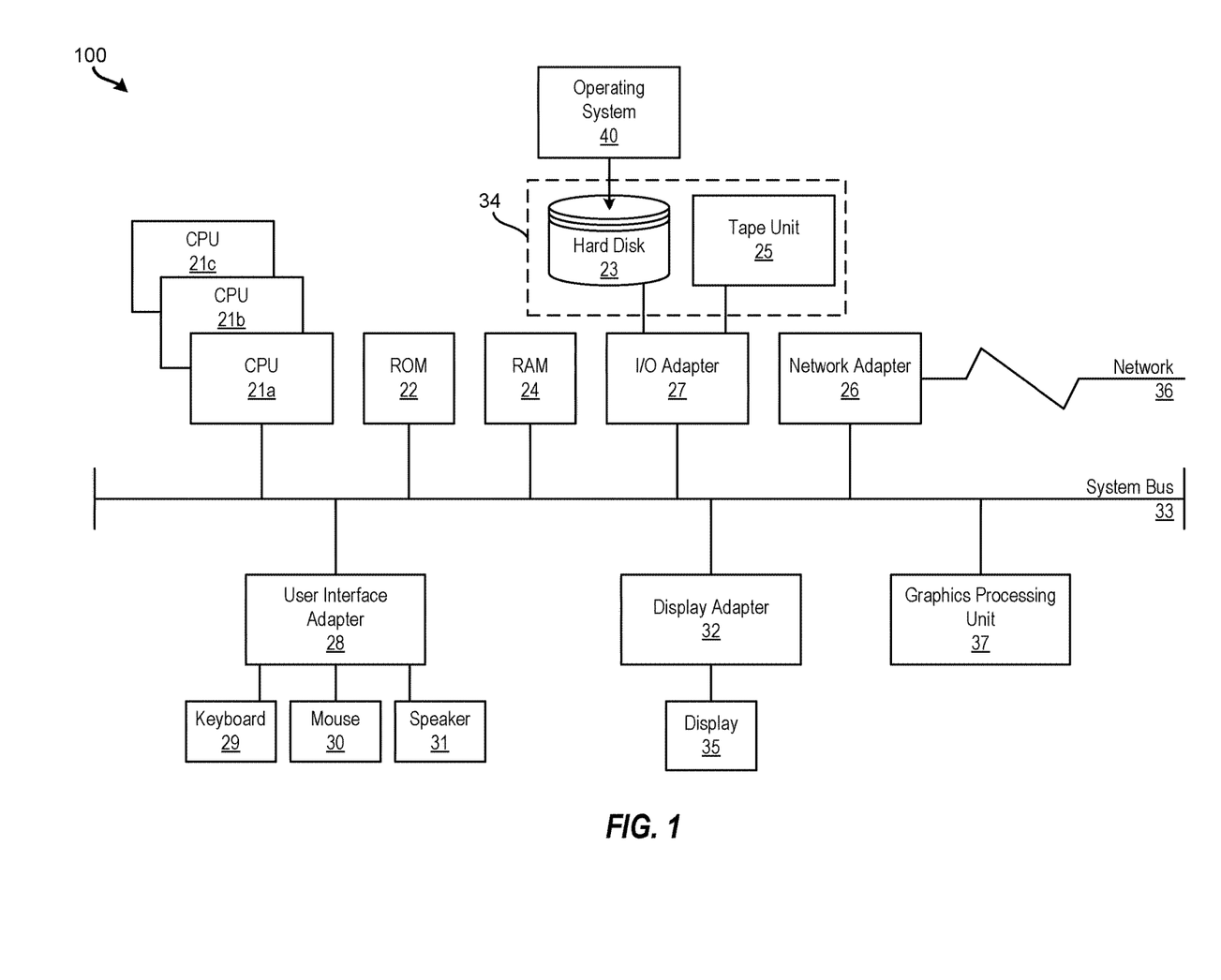
FIG. 1 depicts a processing system for implementing the techniques described herein according to embodiments of the present invention.

It is understood that embodiments of the present invention are capable of being implemented in conjunction with any other suitable type of computing environment now known or later developed. For example, FIG. 1 depicts a block diagram of a processing system 100 for implementing the techniques described herein. In examples, processing system 100 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 100.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 100 may be stored in mass storage 34. A network adapter 26 interconnects system bus 33 with an outside network 36 enabling processing system 100 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in the processing system 100.

Turning now to an overview of technologies that are more specifically relevant to aspects of the invention, highly distributed, large symmetric multiprocessing (SMP) systems utilize decentralized cache line access arbitration. In a highly distributed large SMP system with decentralized cache line access arbitration and asymmetrical communication lengths between processor drawers, ensuring fair access to a semaphore/lock address by each of the processors in the system is challenging.

Typically, in a multi-processor drawer system, the processor drawer that has ownership of a cache line gives up ownership eventually, such as to the first remote drawer request that arrives when the cache line has been installed in its local cache. A subsequent request from other remote drawers is rejected and retried. Once the cache line moves to the new drawer, the first drawer of many doing the snoop retry that lands on the new drawer will be chosen as the next owner of the cache line. As the contention for a cache line persists by the multitude of drawers, the order in which drawers receive ownership of the cache line is random. Furthermore, when a semaphore is frequently used by hundreds of processors, the chance that some drawers can access the semaphore more often than other drawers is very high.

The present techniques ensure lock line fairness across multiple processors in a highly distributed SMP system with decentralized cache line access arbitration and asymmetrical communication lengths between processor drawers and to improve locked time efficiency by minimizing the time a semaphore/lock address is in transit between processors.

Turning now to an overview of the aspects of the invention, one or more embodiments of the invention address the above-described shortcomings of the prior art by minimizing a window where new on-drawer requests are being held up due to remote requests in flight. This is achieved by adding local (LCL) pending status/flag to prevent local requestors from loading local (LFAR) controller while a remote controller is in the process of taking a cache line away from a drawer. This helps ensure that the drawers have approximately equal opportunities to obtain exclusive access to a cache line.

Additionally, one or more embodiments of the invention address the above-described shortcomings of the prior art by ensuring fairness between accessing a hot cache line by processors on multiple drawers. This is achieved by adding a remote (RMT) pending status/flag to track requests that are currently active on the fabric of the system. This provides the opportunity to a comparison logic to create a fair way to move a cache line from one drawer to the next based on a current poll of outstanding requests instead of based on which requestor arrives first.

Figure 2:
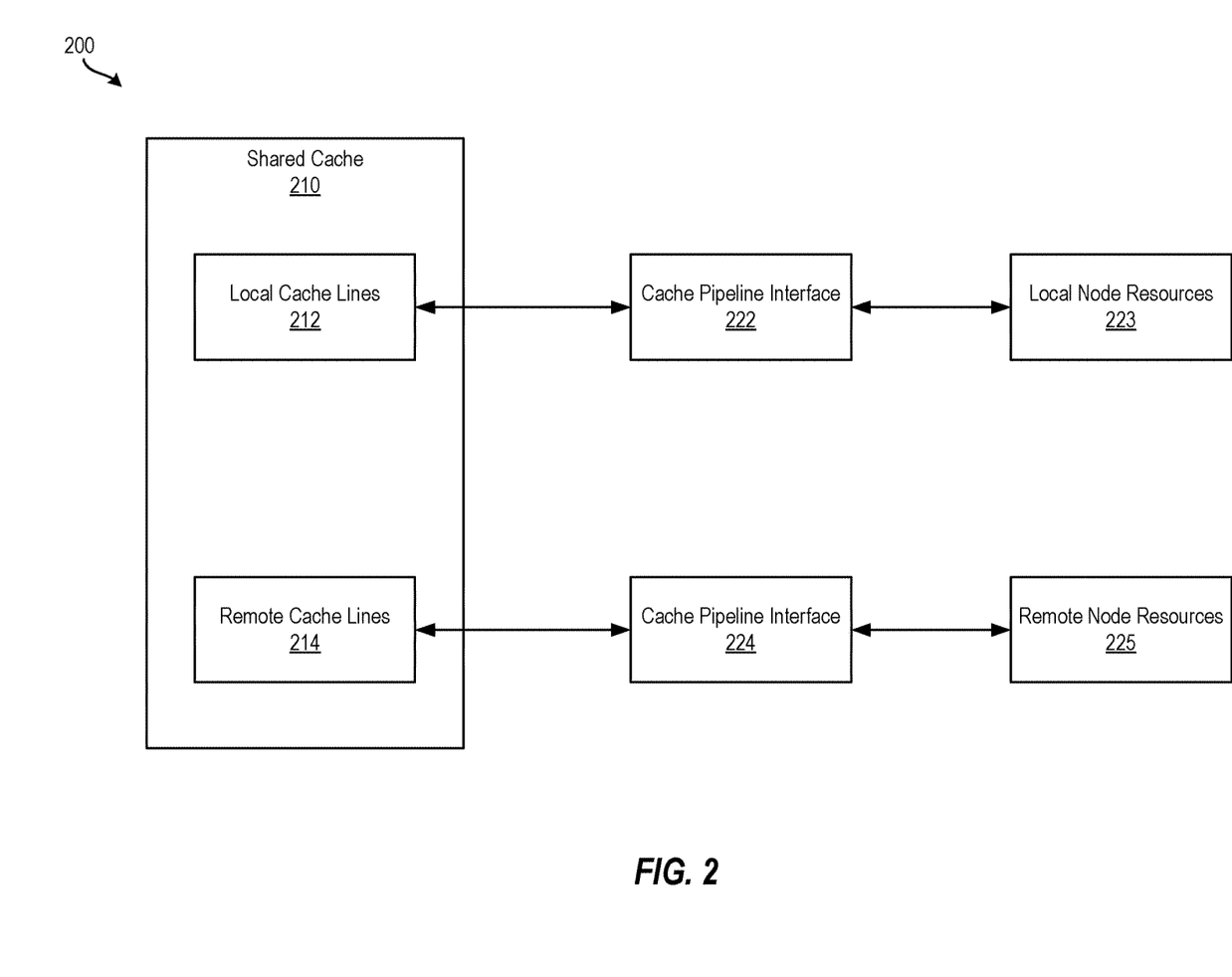
FIG. 2 depicts a multi-node processing system according to embodiments of the present invention.

Turning now to a more detailed description of aspects of the present invention, FIG. 2 depicts a multi-node processing system 200 according to embodiments of the invention. The multi-node processing system 200 can be a symmetric multiprocessing (SMP) system, for example, or another suitable type of processing system.

The multi-node processing system 200 includes a shared cache 210 that is shared by local node resources 223 and remote node resources 225 configured and arranged as shown. The local node resources 223 access local cache lines 212 in the shared cache 210 via a cache pipeline interface 222. Similarly, the remote node resources 225 access remote cache lines 214 via a cache pipeline interface 224.

Figure 3:
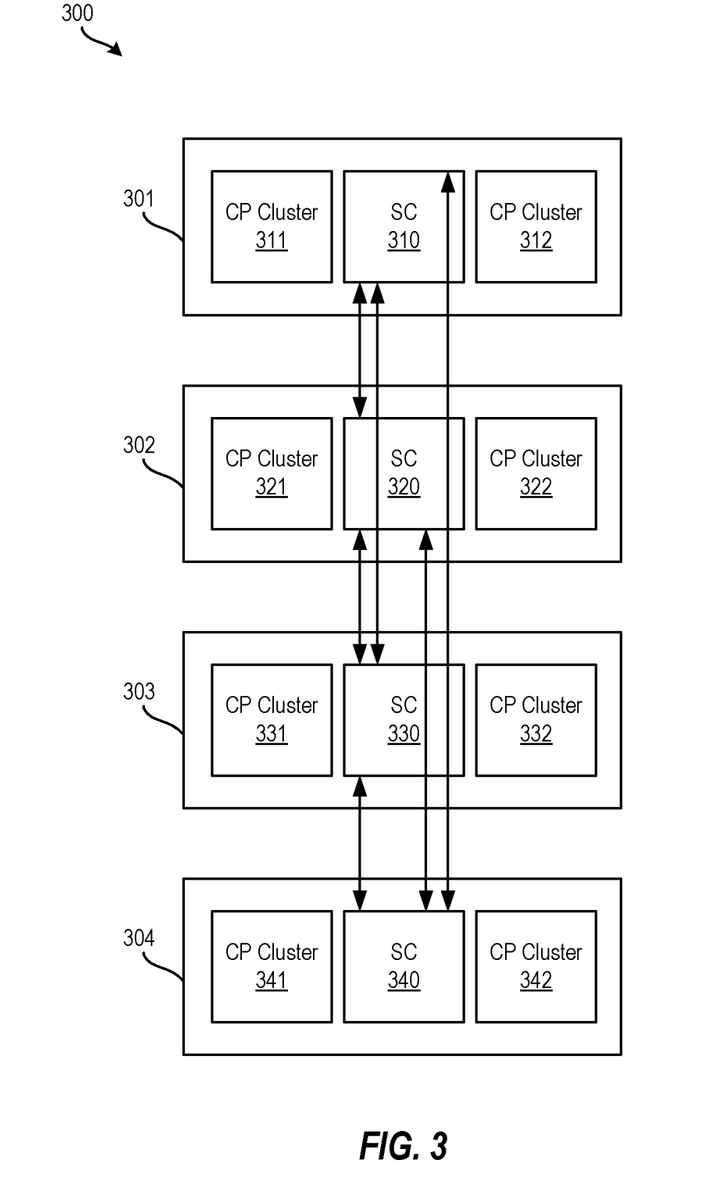
FIG. 3 depicts a multi-node processing system according to embodiments of the present invention.

FIG. 3 depicts a multi-node processing system 300 including a plurality of interconnected drawers 301, 302, 303, 304 according to embodiments of the present invention. Each of the drawers 301-304 include two central processor (CP) clusters and a shared cache (SC) chip configured and arranged as shown. For example, the drawer 301 includes a CP cluster 311, a CP cluster 312, and an SC 310; the drawer 302 includes a CP cluster 321, a CP cluster 322, and an SC 320; the drawer 302 includes a CP cluster 331, a CP cluster 332, and an SC 330; and the drawer 304 includes a CP cluster 341, a CP cluster 342, and an SC 340.

As shown in FIG. 3, each of the SC chips 310, 320, 330, 340 are fully interconnected. That is, SC 310 is communicatively connected directly to SC 320, 330, 340; SC 320 is communicatively connected directly to SC 310, 330, 340; SC 330 is communicatively connected directly to SC 310, 320, 340; and SC 340 is communicatively connected directly to SC 310, 320, 330. Each SC 310, 320, 330, 340 is also communicatively connected to its respective CP clusters (e.g., the SC 310 is communicatively connected to the CP cluster 311 and the CP cluster 312, the SC 320 is communicatively connected to the CP cluster 321 and the CP cluster 322, etc.). Additionally, each SC 310, 320, 330, 340 includes an L4 cache (not shown).

Figure 4:
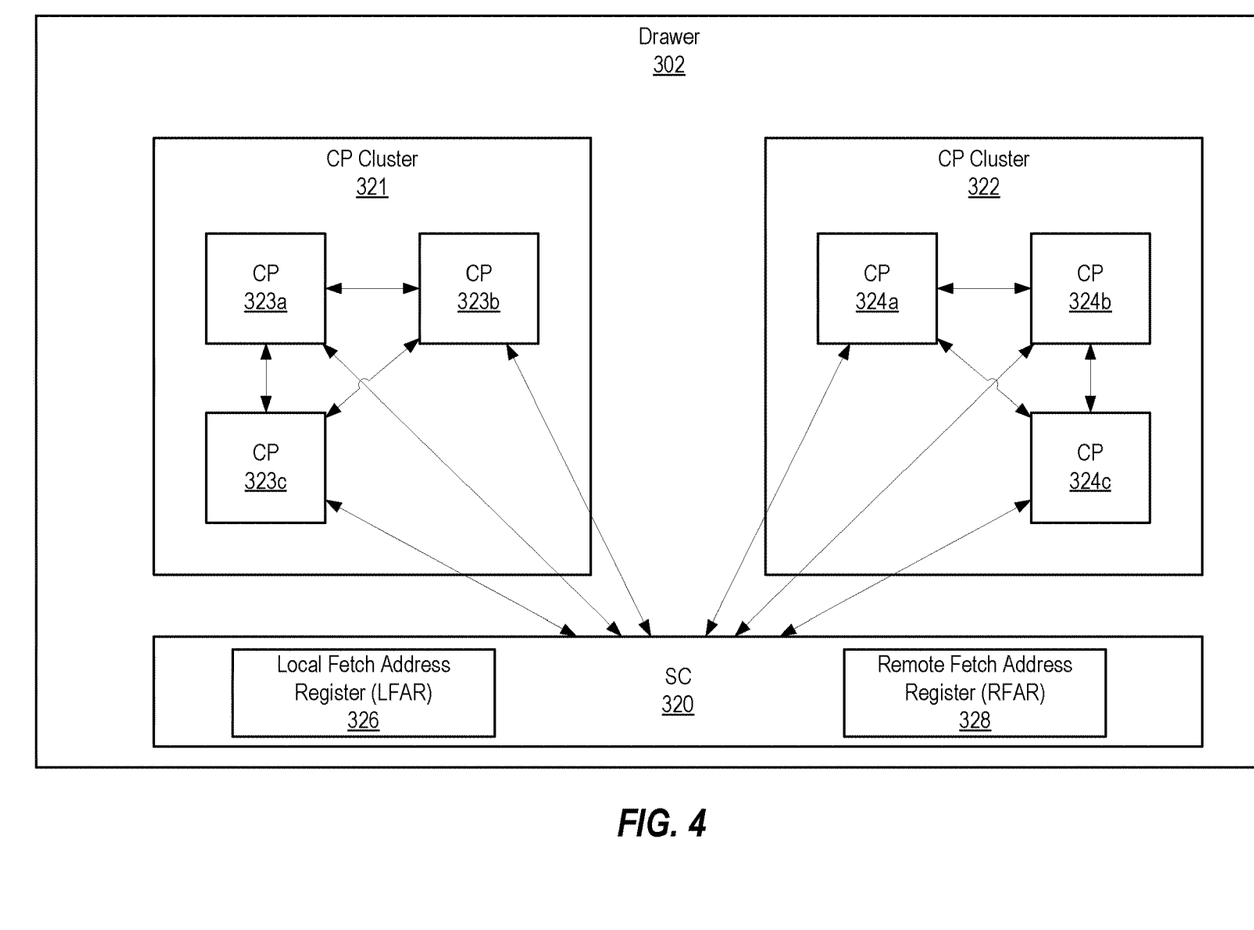
FIG. 4 depicts a drawer of the multi-node processing system of FIG. 3 according to embodiments of the present invention.

FIG. 4 depicts a drawer 302 of the multi-node processing system 300 of FIG. 3 according to embodiments of the present invention. The drawer 302 includes two CP clusters (e.g., CP cluster 321 and CP cluster 322). Each CP cluster contains individual CP chips. For example, CP cluster 321 contains CP chips 323a, 323b, 323c; and CP cluster 322 contains CP chips 324a, 324b, 324c. Each of the individual CP chips (e.g., CP chips 323a, 323b, 323c, 324a, 324b, 324c) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP 323a includes multiple processing cores that each has its own L1/L2 cache, and the multiple processing cores within the CP 323a share an L3 cache.

The SC 320 contains an L4 cache and interconnects for communication with each CP chip (e.g., CP chips 323a, 323b, 323c, 324a, 324b, 324c) in both clusters 321, 322 on the drawer 303 and for communication with other share cache chips on other drawers (e.g., the SC 310 of the drawer 301, the SC 330 of the drawer 303, the SC 340 of the drawer 304, etc.).

Cross drawer fairness represents a mechanism that enables each drawer (e.g., drawer 301, 302, 303, 304) in the system to get access to the same locked cache line in turn. Cache line arbitration amongst the drawers (e.g., drawer 301, 302, 303, 304) in the system is managed by the SC chip of each drawer. For example, the SC 320 manages cache line arbitration for the drawer 302. Each SC chip includes a local fetch address register (LFAR) 326 and a remote fetch address register (RFAR) 328. Each SC chip also includes logic (not shown) to manage the LFAR 326 and the RFAR 328. The LFAR 326 logic is in charge of bringing a cache line on the requesting drawer (e.g., drawer 302). The RFAR 328 logic handles the request on remote drawers (e.g., drawers 301, 303, 304) and is involved in sourcing the data and/or invalidating copies of the cache line as appropriate.

When a local requestor (e.g., CP 323a) requires an exclusive access to a cache line, the SC 320 brings the cache line into the local cache and/or invalidates all copies of the cache line in the system 300. In this case, the SC 320 sends a request to the other drawers (e.g., drawer 301, 303, 304) to fetch the latest copy of the cache line and/or to invalidate all copies of the cache line.

Once a request arrives on the SC 320, the SC 320 snoops the directory to determine a directory state and loads an RFAR (e.g., the RFAR 328) on the drawers that may need to complete the coherency action of the operation. For exclusive fetch type operations, all drawers where the cache line hits in the cache plus the memory drawer load RFAR (e.g., the RFAR 328).

Each drawer (e.g., drawer 301, 302, 303, 304) generates an immediate coherency response based on the snoop directory lookup, which represents the current directory state. If no reject condition is encountered on the drawer that has the highest point of coherency, the operation is allowed to proceed with the data movement and the invalidation of the copies of the data in remote caches. The drawer with highest coherency point can be either an intervention master drawer, such as the drawer where the cache line exists in an exclusive-ownership state, or a memory master drawer when no intervention master drawer exists. Only one drawer can be an intervention master drawer at any given time. In the case when the intervention master drawer invalidated its cached copy of the data earlier, the system 300 uses the memory master drawer to establish coherency. The memory master drawer is the drawer that has the main memory of the requested cache line.

Once RFAR is loaded on the remote drawers, it begins protecting the cache line immediately on the intervention master drawer. It also notifies all processors (e.g., CPs) on the remote drawers that own a copy of the cache line that they need to give up ownership of the cache line. This implies that RFAR also needs to ensure that no new processor (e.g., CP) gets access to the cache line after all the processors are notified that they need to give up ownership of the cache line. On previous designs, the RFAR valid flag was used to prevent local shared cache controllers (e.g., SC 320) from being loaded for the same cache line. Since the RFAR valid flag was active for any fetch type operation, there was a very limited time to load LFAR with a hot cache line request. The fact that the RFAR valid flag can be prolonged due to rejects on the file bundle cache extends the window where the local drawer was not able to load LFAR. This caused a significant disadvantage to requests originating from target memory drawers since the RFAR controller would stay valid longer if it had launched a speculative memory access.

To help address this issue a new local (LCL) pending flag was added to RFAR (e.g., RFAR 328). The RFAR 328 sets LCL pending in the following cases: as it sends an invalidation request to the processor(s) that own the cache line on drawers where the cache line exists in the cache; in the case of an intervention master drawer where no reject condition is encountered; and in the case of a target memory drawer where no reject condition is encountered.

Since the LCL pending is only being activated when the operation is not rejected on the fabric or for specific commands, more opportunities exist for the LFAR to get loaded.

This prevents the memory drawer from starving access to the cache line, thus improving the performance of the system 300.

If other requests for the same cache line arrive on the intervention master drawer while the original operation has not finished, these requests are rejected. In past machines, the next drawer who gets the ownership of the cache line is the request that arrives first on the drawer that just became the highest coherency point. This causes unfairness since some drawers can have advantages over other drawers in getting to the new intervention master drawer. This can be caused by different wire latencies or other factors like system topology, where the target memory drawer is located, how quickly the fetch operation can be retried after a reject, etc.

To resolve this unfairness a new remote (RMT) pending is implemented. The RMT pending can be set and reset as follows. To set the RMT pending on RFAR 328, an ingate is performed when the operation arrives on a remote drawer for the first time. The RMT pending remains set even on a reject. The RMT pending is reset when the RFAR 328 resets after successfully getting ownership of the requested cache line.

When a rejected operation retries on the fabric to get access to the cache line, the new drawer that has highest coherency point determines which drawer gets the line next by looking at the outstanding RMT pending from different drawers for that cache line. If more than one RMT pending is, active it will choose a drawer based on a table which is unique for each individual drawer. The request that has RMT pending active and is at the top of the table is accepted next while the other requests are rejected regardless of the order in which they arrive on the drawer that has the highest point of coherency. This allows the cache line to be passed from one drawer to next in a fair way. This is extremely important when it comes to accessing lock lines where hundreds of processors may be requesting ownership of the same line.

Figure 5:
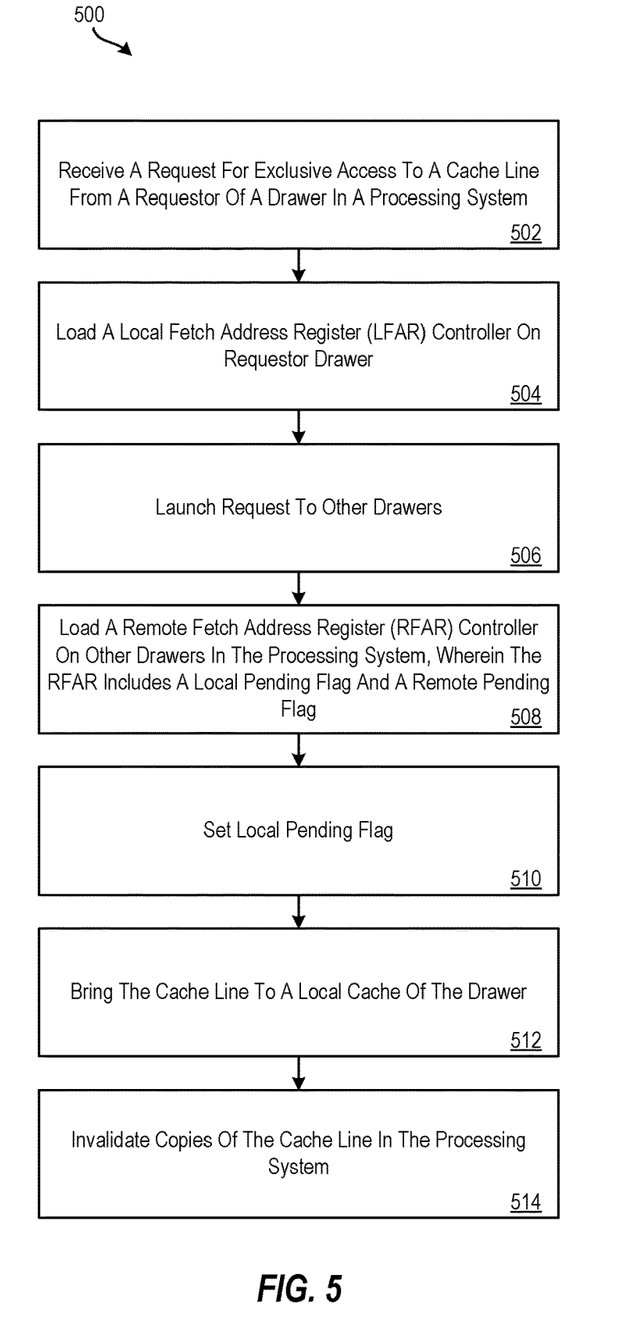
FIG. 5 depicts a flow diagram of a method for hot cache line arbitration according to examples of the present disclosure.

FIG. 5 depicts a flow diagram of a method 500 for hot cache line arbitration according to examples of the present disclosure. The method 500 can be implemented on a suitable processing system, such as the processing system 100, the multi-node processing system 200, the multi-node processing system 300, or another suitable processing system.

With reference to FIG. 4, the method 500 can occur as follows. At block 502, the SC 320 receives a request for exclusive access to a cache line from a requestor of a drawer 302 in a processing system 300. At block 504, the SC 320 loads a local fetch address register (LFAR) controller on the requester drawer. At block 506, the SC 320 launches a request to other drawers (e.g., the drawers 301, 303, 304).

At block 508 the SC 320 loads a remote fetch address register (RFAR) controller on other drawers (e.g., the drawers 301, 303, 304) in the processing system 300. The RFAR includes a local pending flag and a remote pending flag.

At block 510, the SC 320 the local pending flag is set. For example, the local pending flag is set when an invalidation request is sent to a processor that owns a cache line on drawers where the cache line exists in the cache. In another example, the local pending flag is set when the drawer is an intervention master drawer and when no rejection condition is encountered. In yet another example, the local pending flag is set when the drawer is a memory master drawer and when no rejection condition is encountered.

At block 512 the SC 320 brings the cache line to a local cache of the drawer 302. At block 514 the SC 320 invalidates copies of the cache line in the processing system 300.

Accordingly, the method 500 minimizes the window where new, on-drawer requests are being held up due to remote requests in flight. This helps ensure that all drawers have equal opportunities in getting exclusive access to a cache line.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6:
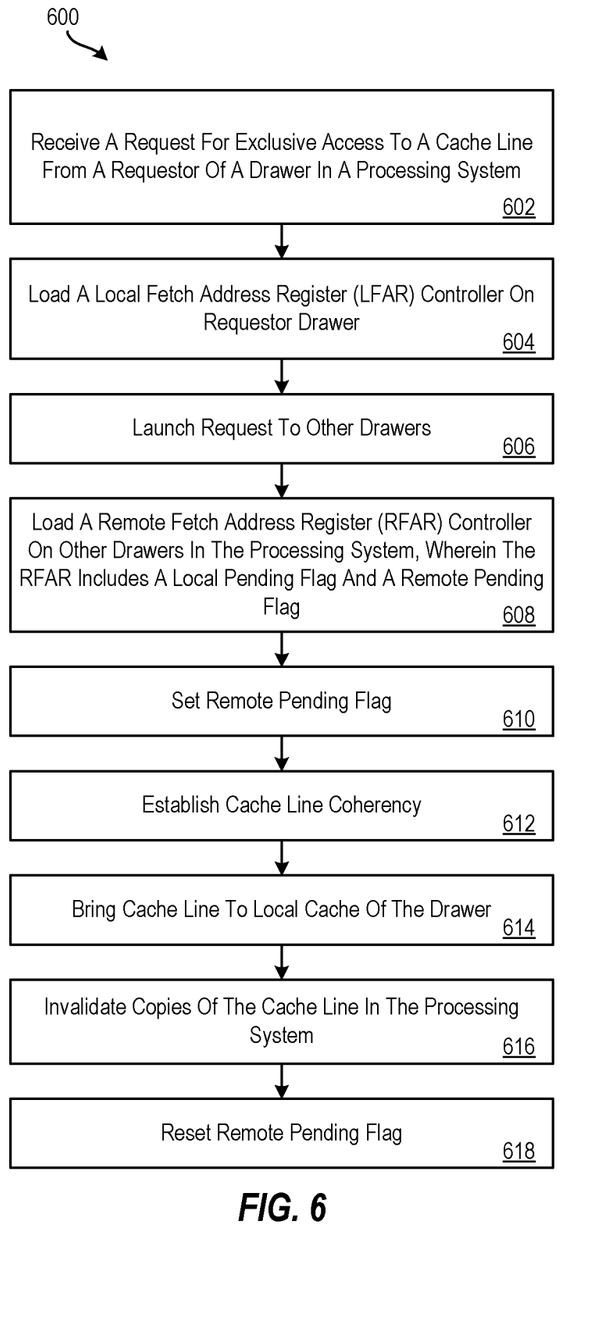
FIG. 6 depicts a flow diagram of another method for hot cache line arbitration according to examples of the present disclosure.

FIG. 6 depicts a flow diagram of a method 600 for hot cache line arbitration according to examples of the present disclosure. The method 600 can be implemented on a suitable processing system, such as the processing system 100, the multi-node processing system 200, the multi-node processing system 300, or another suitable processing system.

With reference to FIG. 4, the method 600 can occur as follows. At block 602, the SC 320 receives a request for exclusive access to a cache line from a requestor of a drawer 302 in a processing system 300. At block 604, the SC 320 loads a local fetch address register (LFAR) controller on the requester drawer. At block 606, the SC 320 launches a request to other drawers (e.g., the drawers 301, 303, 304).

At block 608 the SC 320 loads a remote fetch address register (RFAR) controller on other drawers (e.g., the drawers 301, 303, 304) in the processing system 300. The RFAR includes a local pending flag and a remote pending flag. At block 610, the SC 320 sets the remote pending flag when an operation arrives on a remote drawer for the first time.

At block 612, the SC 320 establishes cache line coherency. At block 614, the SC 320 brings the cache line to a local cache of the drawer 302. At block 616 the SC 320 invalidates copies of the cache line in the processing system 300. At block 618, the SC 320 resets the remote pending flag subsequent to successfully getting ownership of the requested cache line. Accordingly, the method 600 ensures fairness between accessing a hot cache line by processors on multiple drawers based on a current poll of outstanding requests, not the first request to arrive.

Additional processes also may be included, and it should be understood that the processes depicted in FIG. 6 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for hot cache line arbitration, the method comprising:
   receiving, by a processing device, a request for exclusive access to a cache line from a requestor of a drawer in a processing system, the drawer being one of a plurality of drawers, each of the plurality of drawers comprising two central processor clusters and a shared cache chip;
   loading, by the processing device, a remote fetch address register (RFAR) controller on other drawers in the processing system, wherein the RFAR comprises a local pending flag and a remote pending flag;

bringing, by the processing device, the cache line to a local cache of the drawer; and invalidating, by the processing device, copies of the cache line in the processing system, wherein the local pending flag is set when an invalidation request is sent to a processor that owns the cache line on the plurality of drawers where the cache line exists.

2. The computer-implemented method of claim 1, wherein bringing the cache line to the local cache of the drawer further comprises sending a request to the other drawers in the processing system to fetch a latest copy of the cache line.

3. The computer-implemented method of claim 2, further comprising, subsequent to the request arriving on the other drawers, snooping a directory to determine a directory state, wherein the loading the RFAR occurs subsequent to the snooping.

4. The computer-implemented method of claim 3, wherein each of the other drawers generates a coherency response based at least in part on the snooping.

5. The computer-implemented method of claim 4, further comprising, responsive to no rejection condition being encountered on a drawer of the other drawers that has a highest point of coherency, allowing an operation to proceed with data movement and invalidation of copies of data in a remote cache.

6. The computer-implemented method of claim 5, wherein the highest point of coherency is based at least in part on the drawer of the other drawers being one of an intervention master drawer or a memory master drawer.

7. The computer-implemented method of claim 1, wherein the processing device is the shared cache chip.

8. The computer-implemented method of claim 1, wherein a local pending flag is set when the drawer is an intervention master drawer and when no rejection condition is encountered.

9. The computer-implemented method of claim 1, wherein a local pending flag is set when the drawer is a memory master drawer and when no rejection condition is encountered.

10. The computer-implemented method of claim 1, wherein the remote pending flag is set when an operation arrives on a remote drawer of the processing system for a first time.

11. The computer-implemented method of claim 1, wherein the remote pending flag is reset subsequent to successfully getting ownership of the requested cache line.

12. A system for hot cache line arbitration, the system comprising:
a memory comprising computer readable instructions; and
a processor for executing the computer readable instructions for performing a method, the method comprising:
receiving, by a processing device, a request for exclusive access to a cache line from a requestor of a drawer in a processing system, the drawer being one of a plurality of drawers, each of the plurality of drawers comprising two central processor clusters and a shared cache chip;
loading, by the processing device, a remote fetch address register (RFAR) controller on other drawers in the processing system, wherein the RFAR comprises a local pending flag and a remote pending flag;
bringing, by the processing device, the cache line to a local cache of the drawer; and
invalidating, by the processing device, copies of the cache line in the processing system,
wherein the local pending flag is set when an invalidation request is sent to a processor that owns the cache line on the plurality of drawers where the cache line exists.

13. The system of claim 12, wherein bringing the cache line to the local cache of the drawer further comprises sending a request to the other drawers in the processing system to fetch a latest copy of the cache line.

14. The system of claim 13, wherein the method further comprises, subsequent to the request arriving on the other drawers, snooping a directory to determine a directory state, wherein the loading the RFAR occurs subsequent to the snooping.

15. The system of claim 14, wherein each of the other drawers generates a coherency response based at least in part on the snooping.

16. The system of claim 15, wherein the method further comprises, responsive to no rejection condition being encountered on a drawer of the other drawers that has a highest point of coherency, allowing an operation to proceed with data movement and invalidation of copies of data in a remote cache.

17. The system of claim 16, wherein the highest point of coherency is based at least in part on the drawer of the other drawers being one of an intervention master drawer or a memory master drawer.

18. A computer program product for hot cache line arbitration, the computer program product comprising:
a computer readable storage medium having program instructions embodied therewith, wherein the computer readable storage medium is not a transitory signal per se, the program instructions executable by a processor to cause the processor to perform a method comprising:
receiving, by a processing device, a request for exclusive access to a cache line from a requestor of a drawer in a processing system, the drawer being one of a plurality of drawers, each of the plurality of drawers comprising two central processor clusters and a shared cache chip;
loading, by the processing device, a remote fetch address register (RFAR) controller on other drawers in the processing system, wherein the RFAR comprises a local pending flag and a remote pending flag;
bringing, by the processing device, the cache line to a local cache of the drawer; and
invalidating, by the processing device, copies of the cache line in the processing system,
wherein the local pending flag is set when an invalidation request is sent to a processor that owns the cache line on the plurality of drawers where the cache line exists.

\* \* \* \* \*